(12) United States Patent
Park et al.

(10) Patent No.: US 7,675,829 B2
(45) Date of Patent: Mar. 9, 2010

(54) METHOD AND APPARATUS FOR OVERWRITING DATA ON RECORDING-MEDIUM AND THE RECORDING MEDIUM

(75) Inventors: Yong Cheol Park, Gwachon-si (KR); Sung Wan Park, Suwon-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/158,358

(22) Filed: Jun. 22, 2005

(65) Prior Publication Data

US 2005/0286368 A1 Dec. 29, 2005

Related U.S. Application Data

(60) Provisional application No. 60/581,717, filed on Jun. 23, 2004.

(30) Foreign Application Priority Data

Oct. 25, 2004 (KR) ............... 10-2004-0085288

(51) Int. Cl.
G11B 20/18 (2006.01)
(52) U.S. Cl. ................ 369/53.17; 369/47.14
(58) Field of Classification Search ............ None
See application file for complete search history.

(56) References Cited

U.S. PATENT DOCUMENTS

| | | | |
|---|---|---|---|
| 4,558,446 A | 12/1985 | Banba et al. | |
| 4,733,386 A | 3/1988 | Shimoi | |
| 4,807,205 A | 2/1989 | Picard | |
| 4,963,866 A | 10/1990 | Duncan | |
| 5,068,842 A | 11/1991 | Naito | |
| 5,111,444 A | 5/1992 | Fukushima et al. | |
| 5,210,734 A | 5/1993 | Sakurai | |
| 5,235,585 A | 8/1993 | Bish et al. | |
| 5,237,553 A | 8/1993 | Fukushima et al. | |
| 5,247,494 A | 9/1993 | Ohmo et al. | |
| 5,319,626 A | 6/1994 | Ozaki et al. | |
| 5,404,357 A | 4/1995 | Ito et al. | |
| 5,442,611 A | 8/1995 | Hosaka | |
| 5,448,728 A * | 9/1995 | Takano et al. | ........... 707/205 |
| 5,475,820 A | 12/1995 | Natrasevschi et al. | |

(Continued)

FOREIGN PATENT DOCUMENTS

CN 1134017 10/1996

(Continued)

OTHER PUBLICATIONS

International Search Report dated Jan. 13, 2006.

(Continued)

*Primary Examiner*—Joseph H Feild
*Assistant Examiner*—Parul Gupta
(74) *Attorney, Agent, or Firm*—Harness, Dickey & Pierce

(57) ABSTRACT

In an embodiment of the method of over-writing a recording medium, if data for writing on the recording medium is to be written on a recorded portion of a user data area of the recording medium, an unrecorded portion of the recording medium is selected as a replacement portion for recording the data and the data is recorded in the replacement portion.

27 Claims, 8 Drawing Sheets

- ISA : Inner Spare Area
- OSA : Outer Spare Area
- DMA : Defect Management Area
- DFL : Defect List

U.S. PATENT DOCUMENTS

| | | |
|---|---|---|
| 5,481,519 A | 1/1996 | Hosoya |
| 5,495,466 A | 2/1996 | Dohmeier et al. |
| 5,528,571 A | 6/1996 | Funahashi et al. |
| 5,553,045 A | 9/1996 | Obata |
| 5,577,194 A | 11/1996 | Wells et al. |
| 5,608,715 A | 3/1997 | Yokogawa et al. |
| 5,715,221 A | 2/1998 | Ito et al. |
| 5,720,030 A | 2/1998 | Kamihara et al. |
| 5,740,435 A | 4/1998 | Yamamoto et al. |
| 5,745,444 A | 4/1998 | Ichikawa et al. |
| 5,799,212 A | 8/1998 | Ohmori |
| 5,802,028 A | 9/1998 | Igarashi |
| 5,805,536 A | 9/1998 | Gage et al. |
| 5,848,038 A | 12/1998 | Igarashi |
| 5,867,455 A | 2/1999 | Miyamoto et al. |
| 5,878,020 A | 3/1999 | Takahashi |
| 5,914,928 A | 6/1999 | Takahashi |
| 6,058,085 A | 5/2000 | Obata |
| 6,118,608 A | 9/2000 | Kakihara et al. |
| 6,138,203 A | 10/2000 | Inokuchi et al. |
| 6,160,778 A | 12/2000 | Ito et al. |
| 6,189,118 B1 | 2/2001 | Sasaki et al. |
| 6,233,654 B1 | 5/2001 | Aoki et al. |
| 6,292,445 B1 | 9/2001 | Ito et al. |
| 6,341,109 B1 | 1/2002 | Kayanuma |
| 6,341,278 B1 | 1/2002 | Yamamoto et al. |
| 6,373,800 B1 | 4/2002 | Takahashi |
| 6,405,332 B1 | 6/2002 | Bando et al. |
| 6,414,923 B1 | 7/2002 | Park et al. |
| 6,447,126 B1 | 9/2002 | Hornbeck |
| 6,466,532 B1 | 10/2002 | Ko |
| 6,469,978 B1 | 10/2002 | Ohata et al. |
| 6,477,126 B1 | 11/2002 | Park et al. |
| 6,480,446 B1 | 11/2002 | Ko |
| 6,493,301 B1 | 12/2002 | Park |
| 6,529,458 B1 | 3/2003 | Shin |
| 6,542,450 B1 | 4/2003 | Park |
| 6,564,345 B1 | 5/2003 | Kim et al. |
| 6,581,167 B1 | 6/2003 | Gotoh et al. |
| 6,594,209 B2 | 7/2003 | Ijtsma et al. |
| 6,606,285 B1 | 8/2003 | Ijtsma et al. |
| 6,615,353 B1 | 9/2003 | Fukasawa |
| 6,631,106 B1 | 10/2003 | Numata et al. |
| 6,633,724 B1 | 10/2003 | Hasegawa et al. |
| 6,667,939 B1 | 12/2003 | Miyamoto |
| 6,671,249 B2 | 12/2003 | Horie |
| 6,697,306 B2 | 2/2004 | Sako |
| 6,714,502 B2 | 3/2004 | Ko et al. |
| 6,724,701 B2 | 4/2004 | Ijtsma et al. |
| 6,738,341 B2 | 5/2004 | Ohata et al. |
| 6,754,860 B2 | 6/2004 | Kim et al. |
| 6,760,288 B2 | 7/2004 | Ijtsma et al. |
| 6,763,429 B1 | 7/2004 | Hirayama |
| 6,766,418 B1 | 7/2004 | Alexander et al. |
| 6,788,631 B1 | 9/2004 | Park et al. |
| 6,795,389 B1 | 9/2004 | Nishiuchi et al. |
| 6,804,797 B2 | 10/2004 | Ko et al. |
| 6,826,140 B2 | 11/2004 | Brommer et al. |
| 6,842,580 B1 | 1/2005 | Ueda et al. |
| 6,845,069 B2 | 1/2005 | Nakahara et al. |
| 6,883,111 B2 | 4/2005 | Yoshida et al. |
| 6,918,003 B2 | 7/2005 | Sasaki |
| 6,934,236 B2 | 8/2005 | Lee et al. |
| 6,999,398 B2 | 2/2006 | Yamamoto et al. |
| 7,002,882 B2 | 2/2006 | Takahashi |
| 7,027,059 B2 | 4/2006 | Hux et al. |
| 7,027,373 B2 | 4/2006 | Ueda et al. |
| 7,042,825 B2 | 5/2006 | Yamamoto et al. |
| 7,050,701 B1 | 5/2006 | Sasaki et al. |
| 7,092,334 B2 | 8/2006 | Choi et al. |
| 7,123,556 B2 | 10/2006 | Ueda et al. |
| 7,149,930 B2 | 12/2006 | Ogawa et al. |
| 7,161,879 B2 | 1/2007 | Hwang et al. |
| 7,184,377 B2 | 2/2007 | Ito et al. |
| 7,188,271 B2 | 3/2007 | Park et al. |
| 7,233,550 B2 | 6/2007 | Park et al. |
| 7,236,687 B2 | 6/2007 | Kato et al. |
| 7,272,086 B2 | 9/2007 | Hwang et al. |
| 7,289,404 B2 | 10/2007 | Park et al. |
| 7,296,178 B2 | 11/2007 | Yoshida et al. |
| 7,313,066 B2 | 12/2007 | Hwang et al. |
| 7,327,654 B2 | 2/2008 | Hwang et al. |
| 7,379,402 B2 | 5/2008 | Ko et al. |
| 2001/0009537 A1 | 7/2001 | Park |
| 2001/0011267 A1 | 8/2001 | Kihara et al. |
| 2001/0026511 A1 | 10/2001 | Ueda et al. |
| 2001/0033517 A1 | 10/2001 | Ando et al. |
| 2001/0043525 A1 | 11/2001 | Ito et al. |
| 2002/0025138 A1 | 2/2002 | Isobe et al. |
| 2002/0097665 A1 | 7/2002 | Ko et al. |
| 2002/0097666 A1 | 7/2002 | Ko et al. |
| 2002/0099950 A1 | 7/2002 | Smith |
| 2002/0136118 A1 | 9/2002 | Takahashi |
| 2002/0136134 A1 | 9/2002 | Ito et al. |
| 2002/0136537 A1 | 9/2002 | Takahashi |
| 2002/0159382 A1 | 10/2002 | Ohata et al. |
| 2002/0161774 A1 | 10/2002 | Tol et al. |
| 2002/0176341 A1 | 11/2002 | Ko et al. |
| 2003/0072236 A1 | 4/2003 | Hirotsune et al. |
| 2003/0095482 A1 | 5/2003 | Hung et al. |
| 2003/0126527 A1 | 7/2003 | Kim et al. |
| 2003/0135800 A1 | 7/2003 | Kim et al. |
| 2003/0137909 A1 | 7/2003 | Ito et al. |
| 2003/0137910 A1 | 7/2003 | Ueda et al. |
| 2003/0142608 A1 | 7/2003 | Yamamoto et al. |
| 2003/0149918 A1 | 8/2003 | Takaichi |
| 2003/0173669 A1 | 9/2003 | Shau |
| 2003/0198155 A1 | 10/2003 | Go et al. |
| 2004/0001408 A1 | 1/2004 | Propps et al. |
| 2004/0004917 A1 | 1/2004 | Lee |
| 2004/0062159 A1 | 4/2004 | Park et al. |
| 2004/0062160 A1 | 4/2004 | Park et al. |
| 2004/0076096 A1 | 4/2004 | Hwang et al. |
| 2004/0105363 A1 | 6/2004 | Ko et al. |
| 2004/0114474 A1 | 6/2004 | Park et al. |
| 2004/0120233 A1 | 6/2004 | Park et al. |
| 2004/0125716 A1 | 7/2004 | Ko et al. |
| 2004/0125717 A1 | 7/2004 | Ko et al. |
| 2004/0136292 A1 | 7/2004 | Park et al. |
| 2004/0145980 A1 | 7/2004 | Park et al. |
| 2004/0158768 A1 | 8/2004 | Park et al. |
| 2004/0174782 A1 | 9/2004 | Lee et al. |
| 2004/0174785 A1 | 9/2004 | Ueda et al. |
| 2004/0179445 A1 | 9/2004 | Park et al. |
| 2004/0179458 A1 | 9/2004 | Hwang et al. |
| 2004/0223427 A1 | 11/2004 | Kim et al. |
| 2004/0246849 A1 | 12/2004 | Hwang et al. |
| 2004/0246851 A1 | 12/2004 | Hwang et al. |
| 2004/0246852 A1 | 12/2004 | Hwang et al. |
| 2005/0007910 A1 | 1/2005 | Ito et al. |
| 2005/0008346 A1 | 1/2005 | Noguchi et al. |
| 2005/0025007 A1 | 2/2005 | Park |
| 2005/0047294 A1 | 3/2005 | Park |
| 2005/0050402 A1* | 3/2005 | Koda et al. .................... 714/42 |
| 2005/0052972 A1 | 3/2005 | Park |
| 2005/0052973 A1 | 3/2005 | Park |
| 2005/0055500 A1 | 3/2005 | Park |
| 2005/0060489 A1 | 3/2005 | Park |
| 2005/0068877 A1 | 3/2005 | Yeo |
| 2005/0083740 A1 | 4/2005 | Kobayashi |
| 2005/0083767 A1 | 4/2005 | Terada et al. |
| 2005/0083830 A1 | 4/2005 | Martens et al. |
| 2005/0195716 A1 | 9/2005 | Ko et al. |
| 2005/0207262 A1 | 9/2005 | Terada et al. |

| | | |
|---|---|---|
| 2005/0289389 A1 | 12/2005 | Yamagami et al. |
| 2006/0077827 A1 | 4/2006 | Takahashi |
| 2006/0195719 A1 | 8/2006 | Ueda et al. |
| 2006/0203635 A1 | 9/2006 | Ko et al. |
| 2006/0203638 A1 | 9/2006 | Ko et al. |
| 2006/0203684 A1 | 9/2006 | Ko et al. |
| 2006/0227694 A1 | 10/2006 | Woerlee et al. |
| 2007/0294571 A1 | 12/2007 | Park et al. |
| 2008/0046780 A1 | 2/2008 | Shibuya et al. |

FOREIGN PATENT DOCUMENTS

| | | |
|---|---|---|
| CN | 1140897 | 1/1997 |
| CN | 1227950 | 9/1999 |
| CN | 1273419 | 11/2000 |
| CN | 1675708 | 9/2005 |
| CN | 1685426 | 10/2005 |
| DE | 199 54 054 | 6/2000 |
| EP | 0 314 186 | 5/1989 |
| EP | 0 325 823 | 8/1989 |
| EP | 0 350 920 | 1/1990 |
| EP | 0 428 208 | 11/1990 |
| EP | 0 464 811 | 1/1992 |
| EP | 0 472 484 | 2/1992 |
| EP | 0 477 503 A2 | 4/1992 |
| EP | 0 556 046 | 8/1993 |
| EP | 0 871 172 | 10/1998 |
| EP | 0 908 882 | 4/1999 |
| EP | 0 974 967 | 1/2000 |
| EP | 0 989 554 | 3/2000 |
| EP | 0 997 904 | 5/2000 |
| EP | 1 026 681 | 8/2000 |
| EP | 1 043 723 | 10/2000 |
| EP | 1 132 914 | 9/2001 |
| EP | 1 148 493 | 10/2001 |
| EP | 1 152 414 | 11/2001 |
| EP | 1 239 478 | 9/2002 |
| EP | 1 274 081 | 1/2003 |
| EP | 1 298 659 | 4/2003 |
| EP | 1 329 888 | 7/2003 |
| EP | 1 347 452 | 9/2003 |
| EP | 1 564 740 | 8/2005 |
| EP | 1 612 790 | 1/2006 |
| GB | 2 356 735 | 5/2001 |
| JP | 63-091842 | 4/1988 |
| JP | 1-263955 | 10/1989 |
| JP | 2-023417 | 1/1990 |
| JP | 2831369 | 8/1990 |
| JP | 5-274814 | 10/1993 |
| JP | 06-338139 | 12/1994 |
| JP | 6-349201 | 12/1994 |
| JP | 8-096522 | 4/1996 |
| JP | 9-145634 | 6/1997 |
| JP | 09-231053 | 9/1997 |
| JP | 10-050005 | 2/1998 |
| JP | 10-050032 | 2/1998 |
| JP | 10-187356 | 7/1998 |
| JP | 10-187357 | 7/1998 |
| JP | 10-187358 | 7/1998 |
| JP | 10-187359 | 7/1998 |
| JP | 10-187360 | 7/1998 |
| JP | 10-187361 | 7/1998 |
| JP | 10-261286 | 9/1998 |
| JP | 11-110888 | 4/1999 |
| JP | 11-203792 | 7/1999 |
| JP | 2000-090588 | 3/2000 |
| JP | 2000-149449 | 5/2000 |
| JP | 2000-195178 | 7/2000 |
| JP | 2000-215612 | 8/2000 |
| JP | 2000-285607 | 10/2000 |
| JP | 2001-023317 | 1/2001 |
| JP | 2001-069440 | 3/2001 |
| JP | 2001-110168 | 4/2001 |
| JP | 2001-351334 | 12/2001 |
| JP | 2001-357623 | 12/2001 |
| JP | 2002-015507 | 1/2002 |
| JP | 2002-015525 | 1/2002 |
| JP | 2002-050131 | 2/2002 |
| JP | 2002-056619 | 2/2002 |
| JP | 2002-215612 | 8/2002 |
| JP | 2002-245723 | 8/2002 |
| JP | 2002-288938 | 10/2002 |
| JP | 2002-329321 | 11/2002 |
| JP | 2002-352522 | 12/2002 |
| JP | 2003-346429 | 12/2003 |
| JP | 2004-171714 | 6/2004 |
| JP | 2004-280864 | 10/2004 |
| JP | 2004-280865 | 10/2004 |
| JP | 2004-303381 | 10/2004 |
| JP | 2006-521660 | 10/2004 |
| JP | 2005-004912 | 1/2005 |
| JP | 2005-535993 | 11/2005 |
| JP | 2005-538490 | 12/2005 |
| JP | 2005-538491 | 12/2005 |
| JP | 2006-519445 | 8/2006 |
| KR | 10-2004-0094301 | 11/2004 |
| TW | 371752 | 10/1999 |
| TW | 413805 | 12/2000 |
| WO | WO 84/00628 | 2/1984 |
| WO | WO 96/30902 | 10/1996 |
| WO | WO 97/17652 | 5/1997 |
| WO | WO 97/22182 | 6/1997 |
| WO | WO 00/54274 | 9/2000 |
| WO | WO 01/22416 | 3/2001 |
| WO | WO 01/93035 | 12/2001 |
| WO | WO 03/007296 | 1/2003 |
| WO | WO 03/025924 | 3/2003 |
| WO | WO 03/079353 | 9/2003 |
| WO | WO 2004/015707 | 2/2004 |
| WO | WO 2004/015708 | 2/2004 |
| WO | WO 2004/025648 | 3/2004 |
| WO | WO 2004/025649 | 3/2004 |
| WO | WO 2004/029668 | 4/2004 |
| WO | WO 2004/029941 | 4/2004 |
| WO | WO 2004/029968 | 4/2004 |
| WO | WO 2004/034396 | 4/2004 |
| WO | WO 2004/036561 | 4/2004 |
| WO | WO 2004/053872 | 6/2004 |
| WO | WO 2004/053874 | 6/2004 |
| WO | WO 2004/068476 | 8/2004 |
| WO | WO 2004/075180 | 9/2004 |
| WO | WO 2004/079731 | 9/2004 |
| WO | WO 2004/079740 | 9/2004 |
| WO | WO 2004/081926 | 9/2004 |
| WO | WP 2004/079631 | 9/2004 |
| WO | WO 2004/086379 | 10/2004 |
| WO | WO 2004/093035 | 10/2004 |
| WO | WO 2004/100155 | 11/2004 |
| WO | WO 2004/100156 | 11/2004 |
| WO | WO 2005/004123 | 1/2005 |
| WO | WO 2005/004154 | 1/2005 |

OTHER PUBLICATIONS

"JIS Handbook Data Processing for Hardware," Japanese Standards Association Inc., Japan, Apr. 21, 1999, pp. 1064-1070.
International Search Report and Written Opinion dated Aug. 31, 2004.
International Search Report and Written Opinion dated Jan. 13, 2006.
International Search Report and Written Opinion dated Mar. 8, 2007.
Search Report for corresponding European Application No. 07110035.8 dated Jun. 5, 2008.
Office Action for corresponding Russian Application No. 2006104619/28 dated Jun. 26, 2008.
Extended European Search Report for corresponding European Application No. 07108457.8 dated Dec. 27, 2007.

Search Report for counterpart European patent application No. 05792965.5-1232/1800297 dated Dec. 5, 2008.
Search Report for European patent application No. 04748387.0-2223/1647014 dated Jan. 21, 2009.
Takashi Yokozeki et al., "A Virtual Optical Disk Method to Realize Rewritability and Revision Control on a Write-Once Optical Disc," Systems & Computers in Japan, Wiley, Hoboken, NJ, US, vol. 21, No. 8, Jan. 1, 1990, pp. 34-43.

Office Action for Japanese patent application No. 2007-517955 dated Apr. 3, 2009.
Office Action for Japanese patent application No. 2007-057630 dated Jul. 10, 2009 (with English translation).
Search Report for European patent application No. 09159176.8 dated Jul. 1, 2009.

* cited by examiner

METHOD AND APPARATUS FOR OVERWRITING DATA ON RECORDING-MEDIUM AND THE RECORDING MEDIUM

DOMESTIC PRIORITY INFORMATION

This application claims the benefit of priority on U.S. Provisional Application No. 60/581,717, filed on Jun. 23, 2004, the contents of which are hereby incorporated by reference in their entirety.

This application claims the benefit of priority on Korean Application No. 10-2004-0085288, filed on Oct. 25, 2004, the contents of which are hereby incorporated by reference in their entirety.

BACKGROUND OF THE INVENTION

1. Field of the Invention

The present invention relates to recording media, and methods and apparatuses associated therewith.

2. Discussion of the Related Art

A new type of high density optical disc, such as a Blu-ray RE-writable disc (BD-RE), that can record and store high definition audio and video data for a long period of time, is being developed. As shown in FIG. 1, the BD-RE has a lead-in area, a data zone, and a lead-out area. An inner spare area (ISA) and an outer spare area (OSA) are respectively allocated at a fore end and a rear end of the data zone. A recording unit of the BD-RE is a cluster. Referring to FIG. 1, whether or not a defect area exists within the data zone can be detected during the recording of the data. When a defect area is detected, replacement recording operations are performed. For example, the data that is intended to be recorded in the defect area is recorded in a spare area (e.g., the inner spare area (ISA)). Then, position information of the detected defect area and the replacement recorded spare area are recorded and stored as management information in a defect list (DFL) of a disc management area (DMA) located within the lead-in area.

During a read operation of this data, the data recorded in the spare area is read and reproduced, instead of the data of the defect area, by accessing the DFL; thereby preventing a data recording/reproducing error from occurring.

A write-once recordable blu-ray disc (BD-WO) is also under development. Unlike a rewritable disc, data can only be recorded once in the entire area of a write-once optical disc; and data cannot be physically overwritten in the write-once optical disc. Nevertheless, there may occur instances, where it would be desirable to edit or partially modify recorded data. For example, for simplicity of use of the host or the user, the virtual overwriting of the data may be desirable.

SUMMARY OF THE INVENTION

In an embodiment of the method of over-writing a recording medium, if data for writing on the recording medium is to be written on a recorded portion of a user data area of the recording medium, an unrecorded portion of the recording medium is selected as a replacement portion for recording the data and the data is recorded in the replacement portion.

For example, an unrecorded portion of the user data area of the recording medium may be selected as the replacement portion. In one embodiment, the user data area is divided into a number of recording areas, and an unrecorded portion of a recording area is selected as the replacement portion. In one embodiment, the selecting step selects an unrecorded portion in the recording area including the recorded portion as the replacement portion. In another embodiment, an unrecorded portion of a recording area, which is different from the recording area including the recorded portion, is selected. In yet another embodiment, a spare area, which is separate from the user data area, is selected.

In another embodiment, management information recorded in a management area of the recording medium is accessed to determine if the data for writing on the recording medium is to be written on a recorded portion of the user data area of the recording medium.

In yet another embodiment, an entry is recorded in a management area of the recording medium to indicate a location of the recorded portion and a location of the replacement portion.

In an embodiment of a method of reading data from a user data area of a recording medium, management information in a management area of the recording medium is accessed. the management information includes at least one entry indicating a first recorded portion of the user data area and a second recorded portion of the user data area. The second recorded portion includes data for over-writing data in the first recorded portion. The data from the second recorded portion is read when an instruction for reading data from the first recorded portion is received.

The embodiments of the present invention further includes apparatuses configured to perform the methods of the present invention.

Also, an embodiment of the present invention is directed to a recording medium having a data structure for managing over-writing of data on the recording medium. In this embodiment, the recording medium includes a management area for storing at least one entry. The entry indicates a recorded portion of a user data area of the recording medium that was to be over-written with data and indicates a replacement portion of the user data area storing the data for over-writing.

In another embodiment, the management area stores at least one entry indicating a first recorded portion of the user data area and a second recorded portion of the user data area. Here, the second recorded portion includes data for over-writing data in the first recorded portion.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF EXAMPLE EMBODIMENTS

Reference will now be made in detail to example embodiments of the present invention, which are illustrated in the accompanying drawings. Wherever possible, the same reference numbers will be used throughout the drawings to refer to the same or like parts.

Figure 1:
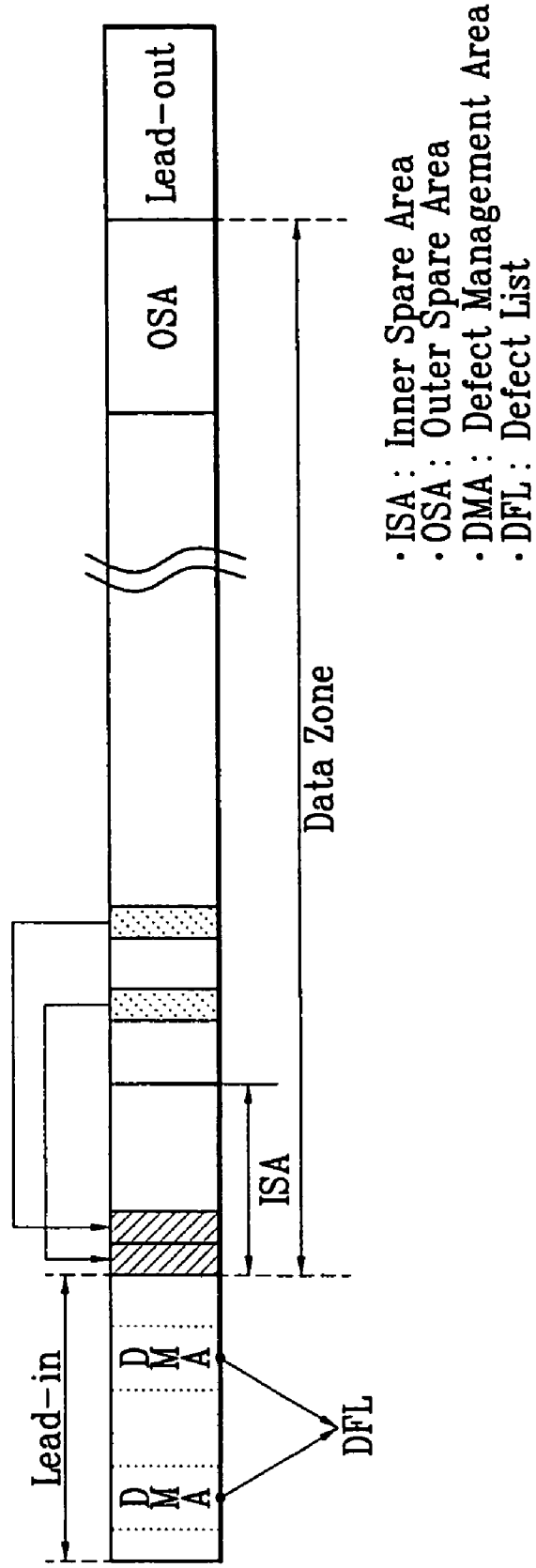
FIG. 1 illustrates a structure of a general re-writable optical disc and a method for managing defects.
Figure 2:
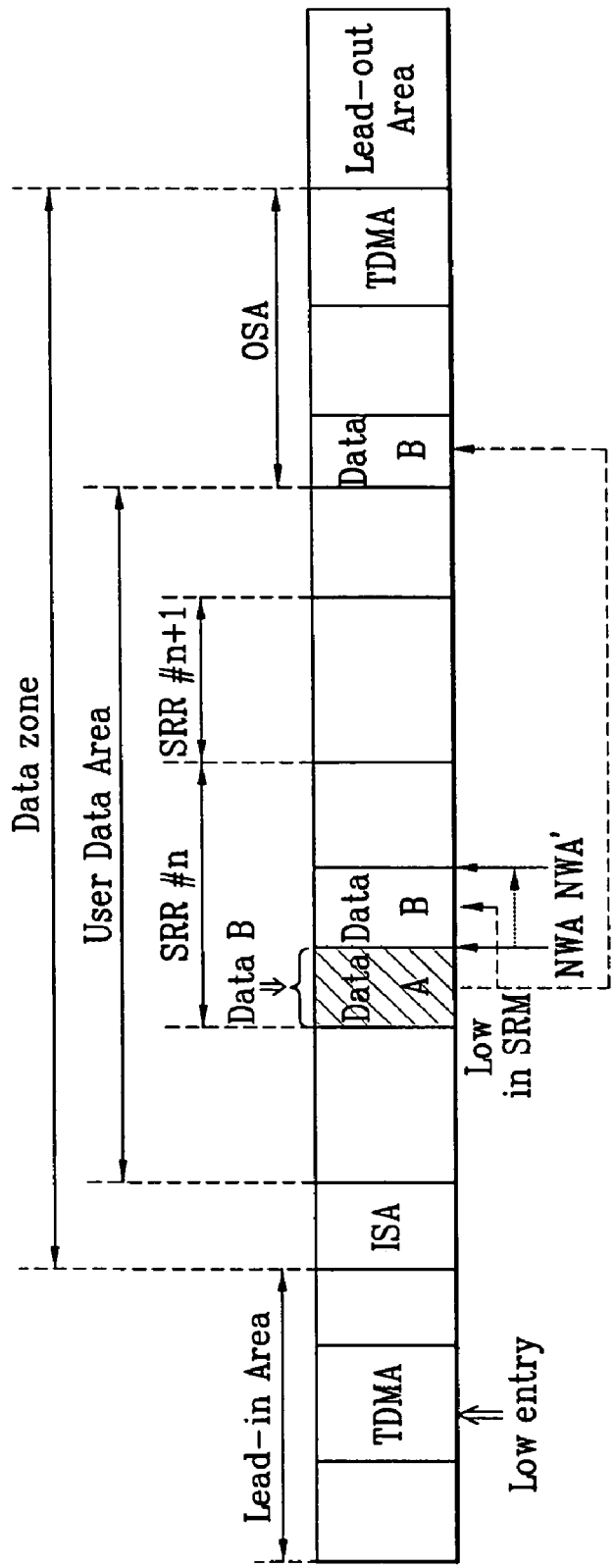
FIG. 2 illustrates a logical overwriting method for a write-once optical disc according to an embodiment of the present invention.

FIG. 2 illustrates a logical overwriting method for a write-once high density optical disc according to an embodiment of the present invention. As shown, the write-once high density optical disc includes a lead-in area, a data zone, and a lead-out area. The data zone includes an inner spare area (ISA), an outer spare area (OSA), and a user data area. The lead-in area is used as an area for recording diverse management information for recording/reproducing data on/from the optical disc. The lead-in area may be provided with a temporary disc management area (TDMA), which is an area for recording defect management information and recording management information for the optical disc. A separate additional TDMA within a spare may also be allocated for defects that may frequently occur during the use of the optical disc and for updating the recording management information.

In a write-once optical disc having the above-described structure, data recording may be categorized into two types: a sequential recording mode (SRM) type and a random recording mode (RRM) type. In the SRM type, in order to facilitate recording of data on the optical disc, the user data area in which actual user data is recorded is divided into a plurality of consecutive recording areas for recording data. Each of the divided plurality of consecutive recording areas is referred to as a Sequential Recording Range (SRR). The recording of data in a SRR is performed on a next recordable (or writable) non-recorded cluster. An address of the next recordable non-recorded cluster in an SRR is referred to as a Next Writable Address (NWA). More specifically, in the SRR, a directly subsequent unrecorded area after a recorded area becomes the NWA, and the recording of data begins from the NWA. Therefore, when sequential recording of data is performed starting from the NWA, the NWA may dynamically increase in accordance with the recording of the data.

In the above-described SRM type, a command for writing (or overwriting) data in a recorded area or portion within a SRR (SRR #n) may be given (or made) by a user or a host. In this case, due to the characteristic of the write-once optical disc, physical writing of the data can only be performed once, and so writing (or recording) of data on a recorded area is not possible. In other words, overwriting of data cannot be physically performed. According to embodiments of the present invention, in the SRM type of the recordable high density optical disc, when an overwriting command requesting data to be overwritten on a recorded area is given (or made), the data that is to be written on the recorded portion is instead recorded beginning at a NWA of the same SRR, beginning at a NWA of another SRR, or in a spare area. This is referred to as a Logical Overwrite (LOW).

For example, as shown in FIG. 2, when a writing (or recording) command for data B of a recorded data A area within an SRR (SRR #n) is transmitted, the data B that is to be recorded in the data A area is either recorded at a next writable area, which is the NWA, of the SRR including the data A area or, alternatively, recorded in a spare area (e.g., the OSA). When the data is recorded in the NWA of the SRR including the data A area, a next writable area from the SRR (SRR #n) becomes NWA'. After performing the replacement recording of the data, as described above, information on the position of the area in which data was to be overwritten (i.e., data A area) and the replacement recorded area (i.e., the data B area of the user data area or the data B area of the spare area) is recorded in the TDMA as a LOW entry. The LOW entry is broadly categorized into two types: a Re-Allocated Defect (RAD) type and a Continuous Re-allocated Defect (CRD) type.

The LOW entry of the RAD type includes information on a logical overwriting performed in a single cluster. Each entry includes a first physical sector number (PSN) of a first cluster of the area in which logical overwriting is performed, and a first physical sector number (PSN) of a first cluster of the area in which replacement recording of the logical overwriting is performed. On the other hand, the LOW entry of the CRD type includes information on a logical overwriting performed in a plurality of consecutive clusters and, therefore, uses two entries. More specifically, one of the two entries includes a first PSN of a first cluster wherein logical overwriting is performed, and a first PSN of a first cluster wherein replacement recording of the logical overwriting is performed. The other entry includes a first PSN of a last cluster wherein logical overwriting is performed, and a first PSN of a last cluster wherein replacement recording of the logical overwriting is performed.

Therefore, when the optical disc logically overwritten, as described above, is reproduced in a later process, an optical disc drive refers to the entry information recorded in the TDMA and identifies the information of the logically overwritten area and the replacement recorded area, thereby being able to reproduce the replacement recorded data B area instead of the data A area. In the SRM type, it may be preferable to perform the replacement recording of the logical overwriting in the NWA of the user data area rather than the spare area. More specifically, in the recordable optical disc, the spare area is also used for replacement recording a defect area as a method of defect management. Therefore, when the spare area is to be used for the replacement recording of the logical overwriting, there lies a problem of having to ensure, in advance, a sufficient range of spare area, the usage of which is unclear, during the initialization of the optical disc. Thus, in order to avoid such problems, it may be preferable to perform replacement recording of the logical overwriting in the NWA of the user data area. When performing logical overwriting in the user data area using the SRM type, the logical overwriting can be performed when the SRR is open and when the SRR is closed.

Figure 3:
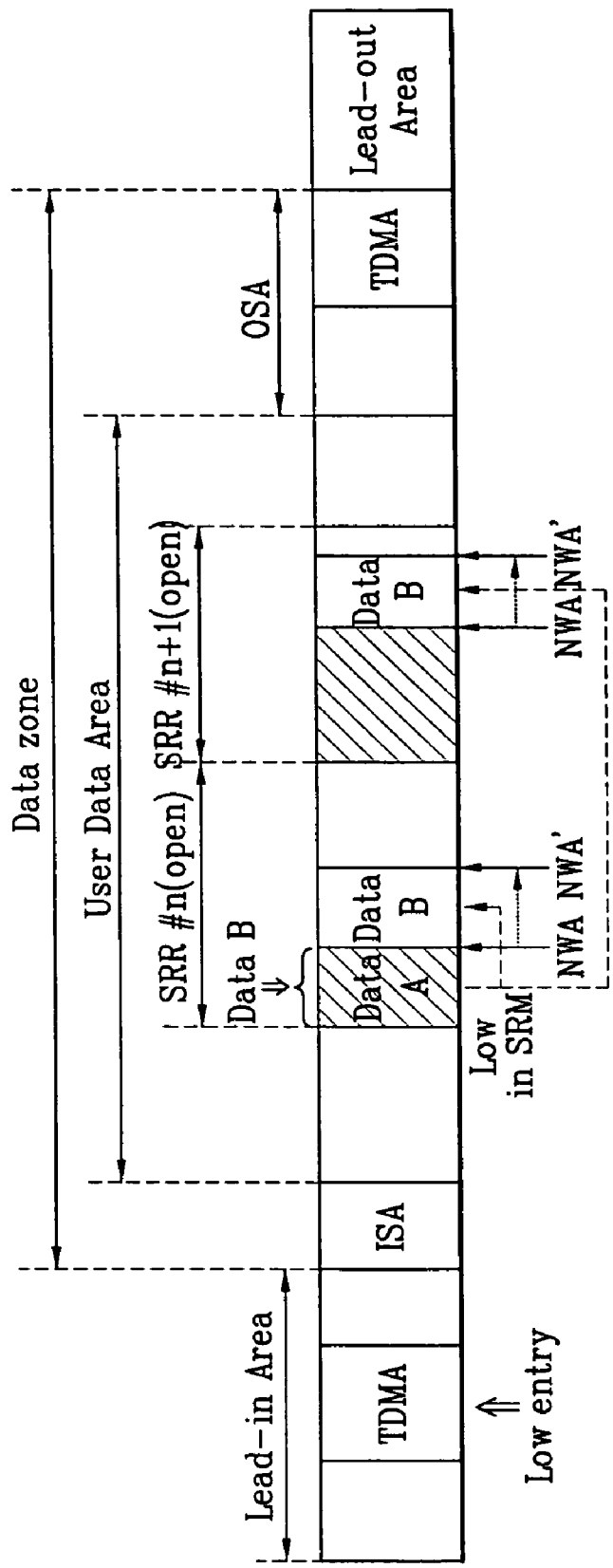
FIG. 3 illustrates an example of logical overwriting being performed on an open sequential recording range (SRR) in a write-once optical disc according to an embodiment of the present invention.

FIG. 3 illustrates an example of logical overwriting being performed on an open SRR in a write-once optical disc according to an embodiment of the present invention. In the SRM, an open SRR refers to a non-recorded SRR or an SRR having some recordable area (i.e., unrecorded portion) remaining. Open SRRs have an NWA. A closed SRR refers to when a recordable area in an SRR no longer remains or exists, or to an SRR changed to a closed state, even though a unrecorded area or portion does exist, but is no longer allowed due to a request from the user or host. Therefore, an NWA does not exist for a closed SRR. Referring to FIG. 3, when an overwriting command for a recorded area is received for an open SRR, the replacement recording may be performed in any of the open SRRs. In other words, when a command for overwriting data B on a recorded data A area is received for an open SRR (SRR #n), the data B that is to be recorded on the data A area is either replacement recorded beginning at the NWA of the SRR including the data A area, or replacement recorded beginning at the NWA of any other open SRR.

Figure 4:
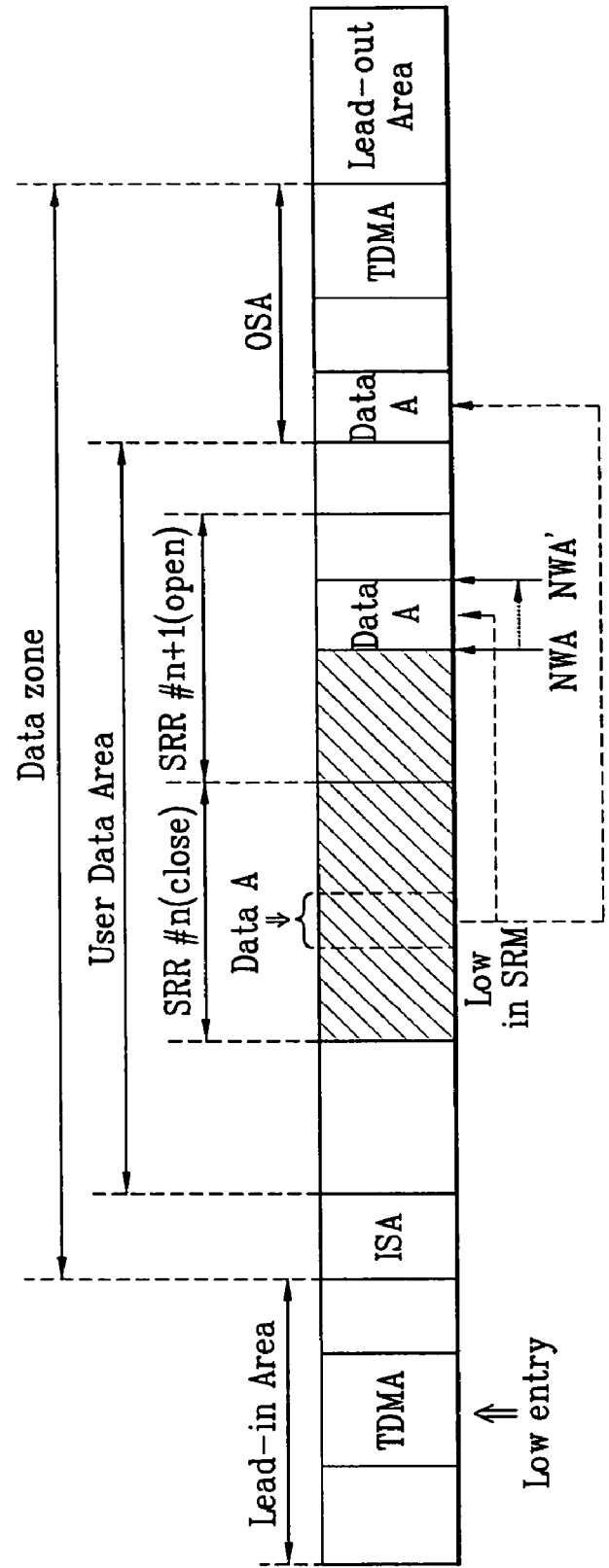
FIG. 4 illustrates an example of logical overwriting being performed on a closed SRR in a write-once recordable optical disc according to an embodiment of the present invention.

FIG. 4 illustrates an example of logical overwriting being performed on a closed SRR in a write-once optical disc according to an embodiment of the present invention. Referring to FIG. 4, when the writing command given (or made) by the host is an overwriting command on a recorded area in a closed SRR, since the closed SRR does not include an NWA, the replacement recording is performed in an open SRR. At this point, when overwriting data on the recorded area of the closed SRR, the replacement recording may also be performed in a spare area. More specifically, the replacement recording is performed beginning at an NWA an open SRR or in a spare area such as the OSA. For a closed SRR, the replacement recording may be specifically performed in a spare area instead of the user data area.

As described above, the logical overwriting in a write-once high density optical disc in the SRM is performed at a NWA. In one embodiment, a maximum of 16 SRRs may be allocated, and a maximum of 16 NWAs may be included, accordingly. A method for selecting an NWA according to an embodiment of the present invention will now be described in detail with reference to FIG. 5.

Figure 5:
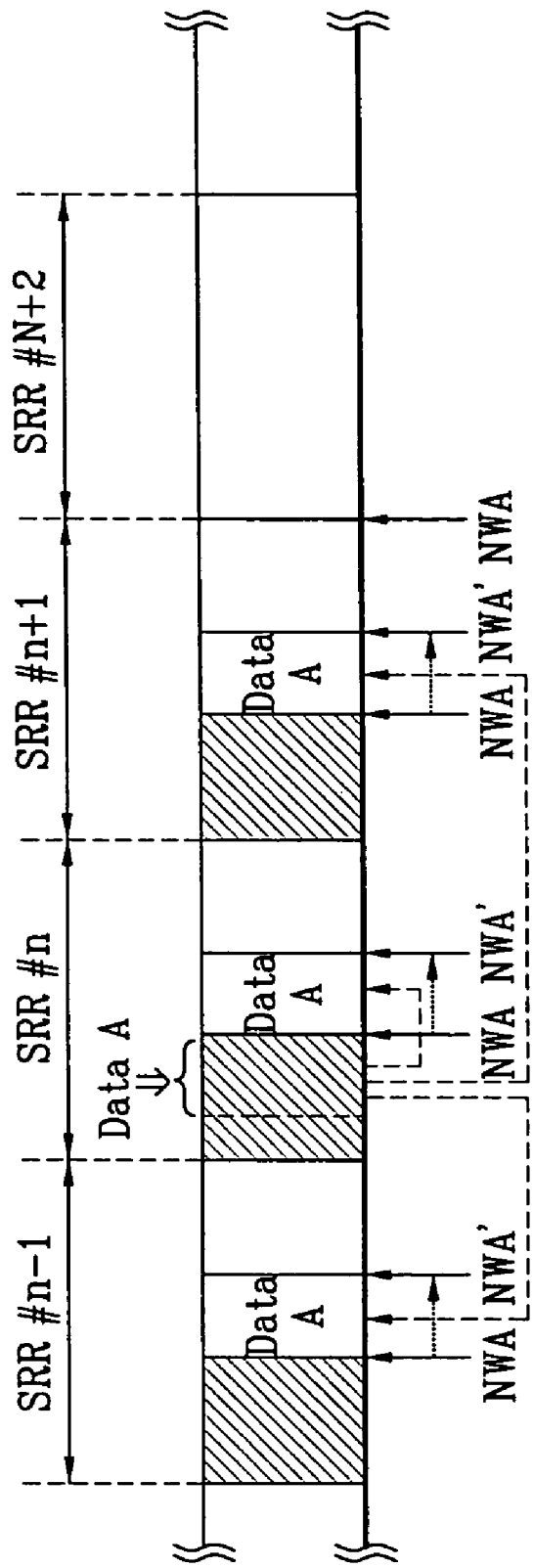
FIG. 5 illustrates a next write address (NWA) selecting method during logical overwriting in a sequential recording mode (SRM) of a write-once optical disc according to an embodiment of the present invention.

FIG. 5 illustrates an NWA selecting method during logical overwriting in a sequential recording mode of a write-once optical disc according to an embodiment of the present invention. Referring to FIG. 5, a plurality of sequential recording ranges (SRRs) may be allocated in the user data area of the write-once high density optical disc. And, in this embodiment, a maximum of 16 SRRs may be allocated. Each of the open SRRs includes an NWA indicating a next writable area.

According to this embodiment, for the plurality of NWAs that may exist, when a writing command requests data to be overwritten on a recorded area, replacement recording is performed in the open SRR containing the data to be overwritten. More specifically, when an NWA exists within an SRR (SRR #n) to which a data overwriting command has been given (or made), replacement recording is performed at the NWA of this open SRR (SRR #n). If the SRRs to which the overwriting command has been given (or made) is unavailable, for example, if the open SRR has been changed (or modified) to closed SRR, the replacement recording is performed at a NWA of a neighboring SRR.

Therefore, when the SRR (SRR #n) to be over-written is a closed SRR, replacement recording is performed in a previous open SRR (SRR #n−1) or a next open SRR (SRR #n+1) of the SRR (SRR #n). Also, the SRR area may be unavailable because the unrecorded portion may be inadequate and insufficient for the replacement recording. In other words, the remaining recordable area of the SRR (SRR #n) or the neighboring SRR (SRR #n+1 or SRR #n−1), may be insufficient, and so replacement recording may not be performed at a single time.

In an embodiment of the present invention, when the remaining recordable area of the SRR or the neighboring SRRs is insufficient to perform replacement recording, the replacement recording is then performed in an open SRR nearest the SRR #n having sufficient recordable (or writable) area. When replacement recording of the data is performed as described above, continuity of the replacement recorded area may be ensured. Furthermore, waste in the re-allocated defect (RAD) entry or the continuous re-allocated defect (CRD) entry, in which the addresses of the overwriting area and the replacement recording area is recorded, can be prevented.

Meanwhile, in another embodiment of the present invention, when the remaining recordable area for the SRR or the neighboring SRR is insufficient to perform replacement recording, replacement recording may be performed in the insufficient area and replacement recording of the remaining data may be continued in a next neighboring open SRR. When using the above-described method, a plurality of RAD or CRD entries may exist in order to indicate replacement recording information of a logical overwriting. Furthermore, in yet another embodiment of the present invention, replacement recording of the logical overwriting is sequentially performed starting from the first open SRR. More specifically, regardless of which SRR the logical overwriting is associated, the replacement recording is performed starting from the first open SRR.

Figure 6:
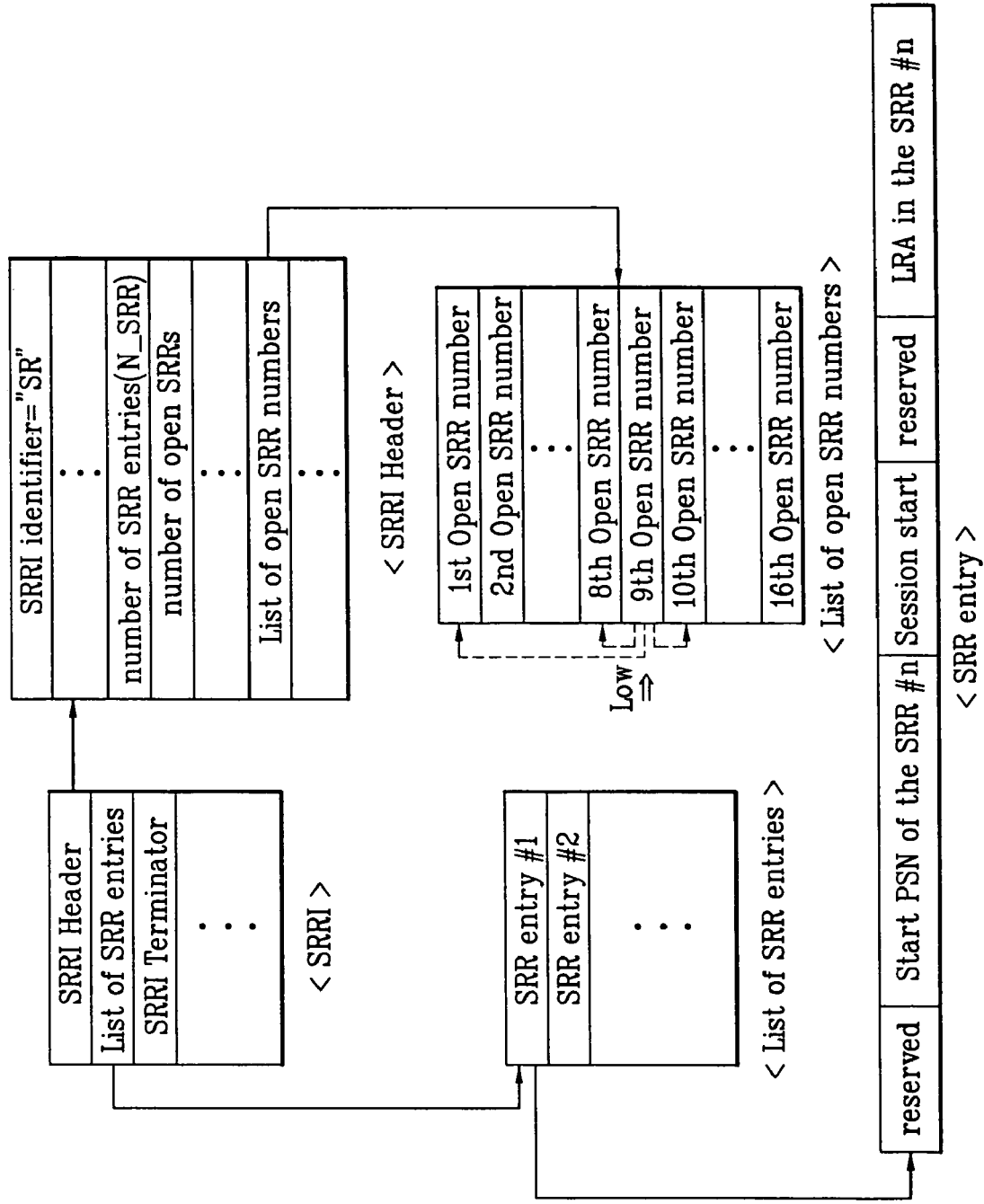
FIG. 6 illustrates a sequential recording range information (SRRI) structure for a sequential recording mode according to an embodiment of the present invention.

When the optical disc drive performs replacement recording on the neighboring SRR or starting from the first open SRR, the information on the first open SRR can be obtained by referring to sequential recording range information (SRRI) that is recorded in the TDMA. This will be described in detail with reference to FIG. 6. FIG. 6 illustrates an SRRI structure according to an embodiment of the present invention. Referring to FIG. 6, the SRRI recorded in the TDMA includes a "SRRI Header" field, a "List of SRR entries" field, and a "SRRI Terminator" field.

The "SRRI Header" field includes a "SRRI identifier='SR'" field, a "number of SRR entries" field, a "number of Open SRRs" field, and a "List of Open SRR numbers" field. Herein, the number of SRR entries, which will be described in a later process, is recorded in the "number of SRR entries" field. The number of open SRRs is recorded in the "number of Open SRRs field", and a number list of the open SRRs is recorded in the "List of Open SRR numbers" field. In the "List of SRR entries" field, a list of the Open SRR numbers is recorded. Herein, a number list of a maximum of 16 allocatable open SRRs is recorded. When the number of allocated open SRRs is lower than '16', then '0' is recorded in an unused Open SRR field. The SRR numbers are aligned by a decreasing (or descending) order. Therefore, the optical disc drive refers to the "List of Open SRR numbers" field when performing logical overwriting so as to search and find a replacement recordable SRR. More specifically, referring to FIG. 6, when the logical overwriting is to be performed in a recorded area of a $9^{th}$ SRR (SRR #9), the data may be replacement recorded on the $9^{th}$ SRR, or replacement recording may be performed on a neighboring (i.e., the closest) SRR, which is the $8^{th}$ SRR or the $10^{th}$ SRR, or replacement recording may be performed starting from the $1^{st}$ SRR.

A list of SRR entries is recorded in the "List of SRR entries" field, of the SRRI. Herein, the SRR entries are sequentially allocated and recorded starting from '1'. At this point, 8 bytes are allocated in an SRR entry, wherein certain information is recorded. The SRR entry includes a "Start PSN of the SRR #n" field, a "Session start" field, and a "LRA in the SRR #n" field. More specifically, a physical sector number (PSN) of a starting position (or area) of SRR #n is allocated in the size of 28 bits and recorded in the "Start PSN of the SRR #n" field. The "Session start" field is the size of 1 bit, and a last recorded area (LRA) of SRR #n is recorded in the "LRA in the SRR #n" field, which has a size of 28 bits.

Thus, the optical disc drive can identify the position information of a recorded area of the corresponding SRR by using the information included in the SRR entry. The NWA indicating the next writable area may be determined by using the "LRA in the SRR #n" field information. Namely, by using the physical sector number (PSN) recorded in the "LRA in the SRR #n", the first sector of the next cluster becomes the NWA. If '0' is already recorded in the "LRA in the SRR #n" field, this indicates that data is not recorded in SRR #n. Therefore, the sector recorded in the "Start PSN of the SRR #n" field becomes the NWA.

As described above, recording of data in the recordable high density optical disc can be broadly categorized into an SRM type and an RRM type. In the RRM type, the recording of data is performed randomly on all non-recorded clusters. In the above-described RRM type, information on the recorded status for the clusters in the user data area is reflected in a space bit map (SBM). More specifically, the SBM includes bits matching one-to-one with the clusters of the user data area so as to indicate the recording status of the corresponding area. The method for logical overwriting data in the RRM type will now be described with reference to FIG. 7.

Figure 7:
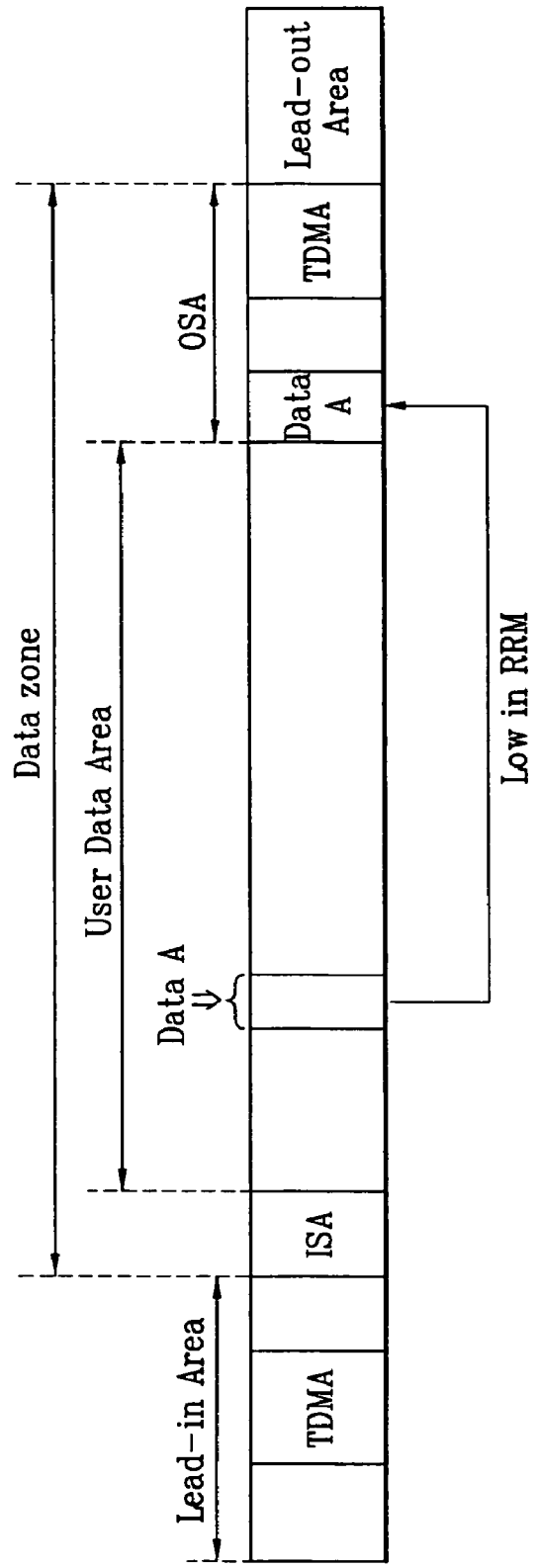
FIG. 7 illustrates a logical overwriting method for a random recording mode (RRM) according to an embodiment of the present invention.

FIG. 7 illustrates a logical overwriting method in an RRM type of recordable optical disc according to an embodiment of the present invention. Referring to FIG. 7, in the RRM type, when an overwriting command is transmitted from the host for overwriting data on a recorded area, the data that is intended to be recorded in the recorded area is replacement recorded in, for example, a spare area. Due to the characteristic of the RRM type, since the data is randomly recorded in the clusters in the user data area, performing replacement recording of the logical overwriting in the user data area may not be efficient. Therefore, in the RRM type, the data of the logical overwriting may be replacement recorded in the spare area such as the OSA. At this point, the spare area may also be used as a replacement area for a defect area, and so the size of the spare area may be sufficiently assigned and allocated during an initialization of the optical disc.

Figure 8:
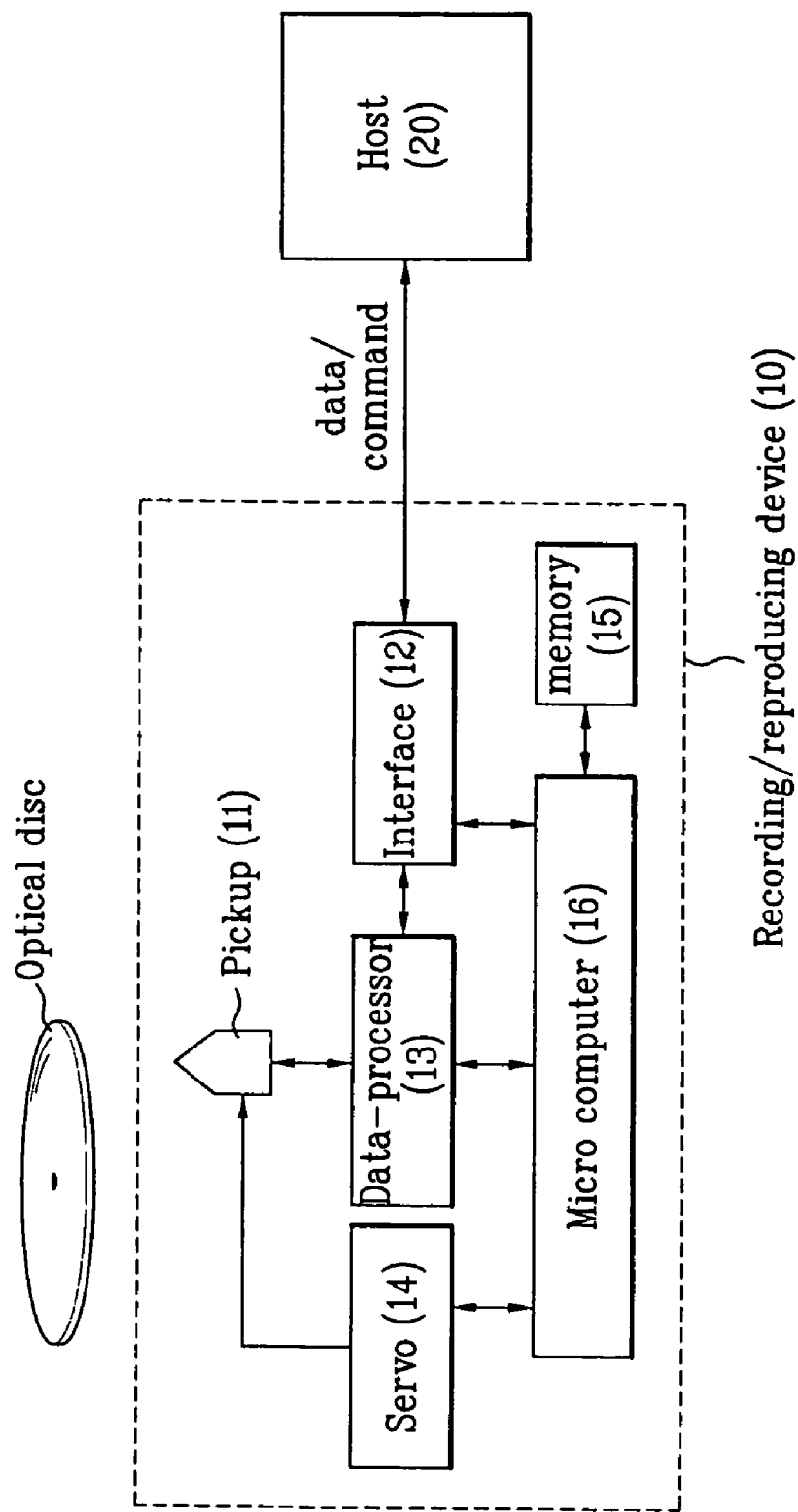
FIG. 8 illustrates a block diagram of an optical recording and reproducing apparatus according to an embodiment of the present invention.

FIG. 8 illustrates a block diagram of an optical recording and reproducing apparatus according to the present invention. Referring to FIG. 8, the optical recording and/or reproducing apparatus includes a recording/reproducing device 10 for performing recording/reproduction on the optical disc, and a host, or controller 20 for controlling the recording/reproducing device 10. (Herein, the recording/reproducing device 10 is often referred to as an "optical disc drive", and both terms will be used in the description of the present invention).

Basically, in the above-described optical recording and reproducing apparatus, the host 20 gives a writing or reproduction command to write or reproduce to/from a particular area of the optical disc to the recording/reproducing device 10, and the recording/reproducing device 10 performs the recording/reproduction to/from the particular area on the optical disc in response to the command from the host 20. The recording/reproducing device 10 includes an interface unit 12 for performing communication, such as exchanges of data and commands, with the host 20; a pickup unit 11 for writing/reading data to/from the optical disc directly; a data processor 13 for receiving a signal from the pickup unit 11 and recovering a desired signal value, or modulating a signal to be recorded into a signal that can be written on the optical disc; a servo unit 14 for controlling the pickup unit 11 to read a signal from the optical disc accurately, or write a signal on the optical disc accurately; a memory 15 for temporarily storing diverse information including management information and data; and a microcomputer 16 for controlling various parts of the recording/reproducing device 10.

In the optical recording and/or reproducing apparatus, process steps of an embodiment of the method for recording data on the recordable optical disc will now be described. Upon inserting the recordable optical disc into the optical recording and/or reproducing apparatus, management information is read from the optical disc and stored in the memory 15 of the recording/reproducing device 10. Herein, if the user desires to write on a particular area of the optical disc, the host 20, which responds to a writing command indicating this desire, provides information on a desired writing position to the recording/reproducing device 10, along with a set of data that is to be written.

The microcomputer 16 in the recording/reproducing device 10 receives the writing command, and determines (i) whether the area of the optical disc in which the host 20 desires to write the data is a defective area or not and/or (ii) whether the area has already been recorded on based on the management information stored in the memory 15. Then, the microcomputer 16 performs data writing according to the writing command from the host 20 on an area which is neither the defective area nor a recorded area. For example, if the area is in a closed SSR or has a starting address less than the LRA of the SSR to be written, then the area is determined as already recorded.

While performing writing of data as described above, when overwriting is to be performed in accordance with the user command, the data that is to be recorded (or written) on the overlapping (or overwriting) area is replacement recorded in another area within the data zone, such as the user data area or the spare area, as described above with respect to one of the embodiments of the present invention. Then, corresponding information including RAD and CRD entries that are created during this process are recorded in the TDMA within the lead-in area. For this, the microcomputer 16 provides the position information of the replacement recorded area and the data according to the command of the host to the servo unit 14 and the data-processor 13, so that the recording or replacement recording is completed at a desired position on the optical disc through the pickup unit 11.

Hereinafter, a method for reproducing data, which is recorded as described above, from the optical disc according to the present invention will be described in detail. When the write-once optical disc, wherein the data is recorded, is inserted into the optical recording and/or reproducing apparatus, management information is read from the optical disc and stored in the memory 15 of the recording/reproducing device 10, for use at the time of recording/reproduction data to/from the optical disc.

Herein, if the user desires to read (or reproduce) data from a particular area of the optical disc, the host 20, which responds to a reading command indicating this desire, provides information on a desired reading position to the recording/reproducing device 10. The microcomputer 16 in the recording/reproducing device 10 receives the reading command, and using the management information determines whether the area of the optical disc from which the host 20 desires to read the data from is an area that has been replaced. If so, the microcomputer 16 determines a position of the replacement area from the management information. However, when replacement recording has not been performed, the microcomputer 16 reads (or reproduces) the data of the indicated area and transmits the read information to the host 20. If replacement recording (e.g., RAD/CRD type) has been performed, the microcomputer 16 reads the data from the determined replacement area and transmits the read information to the host 20.

As described above, the method and apparatus for overwriting data on the recordable high density optical disc according to the present invention has the following advantages. By providing an efficient method for overwriting data in accordance with a recording mode of the write-once high density optical disc, when overwriting data on a recorded area within the optical disc, the write-once high density optical disc can be more efficiently managed and reproduced.

While the invention has been disclosed with respect to a limited number of embodiments, those skilled in the art, having the benefit of this disclosure, will appreciate numerous modifications and variations there from. For example, while described with respect to a Blu-ray write-once optical disk in several instances, the present invention is not limited to this standard of write-once optical disk, to write-once recording media or to optical discs as the recording medium. It is intended that all such modifications and variations fall within the spirit and scope of the invention.

What is claimed is:

1. A method of over-writing a recording medium, the recording medium including a user data area being divided into a number of recording areas, comprising:
   receiving a command to record data on a recorded portion of a recording area of the user data area;
   selecting an unrecorded portion of the recording medium as a replacement portion for recording the data;
   recording the data in the replacement portion;
   recording a single entry in the management area when the data is recorded into a single recording unit of the replacement portion; and
   recording only two entries in the management area when the data is recorded into a plurality of consecutive recording units of the replacement portion even if the plurality of consecutive recording units includes more than two recording units,
   wherein the selecting step selects an unrecorded portion in the same recording area including the recorded portion as the replacement portion if the recording area including the recorded portion is available for recording and the selecting step selects an unrecorded portion in another recording area as the replacement portion if the recording area including the recorded portion is unavailable for recording, and
   each entry includes information on a position of the recorded portion and a position of the replacement portion.

2. The method of claim 1, wherein the selecting step accesses management information from the management area to determine unrecorded portions of the user data area.

3. The method of claim 1, wherein the selecting step determines a beginning of the replacement portion as a beginning of a recording unit in the unrecorded portion of the user data area.

4. The method of claim 1, wherein the recording areas are each for sequentially recording data.

5. The method of claim 4, wherein the selecting step accesses management information from the management area to determine unrecorded portions of the recording areas.

6. The method of claim 1, wherein the recording area including the recorded portion is available for recording if the recording area including the recorded portion has a status of open for recording.

7. The method of claim 6, wherein the selecting step accesses management information from the management area to determine if the recording area including the recorded portion has a status of open for recording.

8. The method of claim 7, wherein the management information indicates a status for each recording area, each status indicating whether an associated recording area is open for recording.

9. The method of claim 6, wherein the recording area including the recorded portion is available for recording if the recording area including the recorded portion has a status of open for recording and includes an unrecorded portion large enough to store the data.

10. The method of claim 9, wherein the selecting step accesses management information from the management area to determine if the recording area including the recorded portion has a status of open for recording, and, if the recording area including the recorded portion is open for recording, the management information indicates a last recorded address for the recording area, and the selecting step accesses the last recorded address to determine if the recording area including the recorded portion includes an unrecorded portion large enough to store the data.

11. The method of claim 10, wherein if the recording area including the recorded portion is available for recording, the selecting step determines a next write address to begin recording the data as a beginning of a first recording unit following the last recorded address for the recording area including the recorded portion.

12. The method of claim 1, wherein the recording area including the recorded portion is unavailable for recording if the recording area including the recorded portion has a status of closed for recording.

13. The method of claim 12, wherein the selected recording area is a recording area nearest the recording area including the recorded portion.

14. The method of claim 12, wherein the selecting step accesses management information from the management area to determine if the recording area including the recorded portion has a status of closed for recording.

15. The method of claim 14, wherein the management information indicates a status for each recording area, each status indicating whether an associated recording area is closed for recording.

16. The method of claim 1, wherein the recording area including the recorded portion is unavailable for recording if the recording area including the recorded portion does not include an unrecorded portion large enough to store the data.

17. The method of claim 16, wherein
   the management information indicates at least a starting sector of each recording area, and for recording areas having a status of open for recording, the management information indicates a last recorded address for the recording area; and
   if the recording area including the recorded portion is open for recording, the selecting step determines whether an unrecorded portion of the recording area including the recorded portion is large enough to record the data based on the management information.

18. The method of claim 1, wherein the entry at least indicates a first sector of the recorded portion and a first sector of the replacement portion.

19. The method of claim 1, further comprising:
   recording at least one entry in the management area of the recording medium, the entry for defect management indicating a location of a defective portion of the user data area and a location of the recording medium replacing the defective portion.

20. The method of claim 1, wherein the recording medium is a write-once recording medium.

21. A method of over-writing a recording medium, comprising:
   accessing management information recorded in a management area of the recording medium, the management information indicating a number of recording areas for sequential recording into which a user data area of the recording medium is currently divided, indicating a starting sector of each recording area, indicating a status of each recording area, and for each recording area having a status of open for recording, indicating a last recorded address;
   receiving a command to record data on a recorded portion of a user data area of the recording medium;

selecting, based on the management information, an unrecorded portion of one of the recording areas as a replacement portion for recording the data; and recording the data in the replacement portion;

recording a single entry in the management area when the data is recorded into a single recording unit of the replacement portion; and recording only two entries in the management area when the data is recorded into a plurality of consecutive recording units of the replacement portion even if the plurality of consecutive recording units includes more than two recording units, wherein the selecting step selects an unrecorded portion in the same recording area including the recorded portion as the replacement portion if the recording area including the recorded portion is available for recording and the selecting step selects an unrecorded portion in another recording area as the replacement portion if the recording area including the recorded portion is unavailable for recording, and each entry includes information on a position of the recorded portion and a position of replacement portion in a management area.

22. The method of claim 21, further comprising:
updating the management information after recording the data.

23. The method of claim 21, wherein the recording medium is a write-once recording medium.

24. A method of reading data from a user data area of a recording medium, the user data area being divided into a number of recording areas, comprising:

accessing management information in a management area of the recording medium, the management information including at least one entry, the at least one entry indicating a first recorded portion of the user data area and a second recorded portion of the user data area and including information on a position of the first recorded portion and a position of the second recorded portion, the second recorded portion including data for over-writing data in the first recorded portion; and reading data from the second recorded portion when an instruction for reading data from the first recorded portion is received, wherein the at least one entry includes a single entry relating to the second recorded portion if the data for over-writing data in the first recorded portion is recorded in a single recording unit and only two entries related to the second recorded portion if the data for over-writing data in the first recorded portion is recorded in a plurality of consecutive recording units even if the plurality of consecutive recording units is more than two recording units.

25. An apparatus for recording data on a recording medium, the recording medium including a user data area being divided into a number of recording areas, comprising:

an optical pick-up device configured to record data on the recording medium; and a controller configured control the optical pick-up device to receive a command to record data on a recorded portion of a recording area of the user data area, configured to select an unrecorded portion of the recording medium as a replacement portion for recording the data, and configured to control the optical pick-up device to record the data in the replacement portion, wherein the controller selects an unrecorded portion in the same recording area including the recorded portion as the replacement portion if the recording area including the recorded portion is available for recording and selects an unrecorded portion in another recording area as the replacement portion if the recording area including the recorded portion is unavailable for recording, and the controller controls the optical pick-up device to record a single entry in the management area when the data is recorded in a single recording unit of the replacement portion and only two entries in the management area when the data is recorded in a plurality of consecutive recording units even if the plurality of consecutive recording units is more than two recording units, each entry including information on a position of the recorded portion and a position of the replacement portion.

26. An apparatus for reading from a recording medium, the recording medium including a user data area being divided into a number of recording areas, comprising:

an optical pick-up device configured to reproduce data from the recording medium; and a controller configured to access management information in a management area of the recording medium, the management area for including at least one entry, the at least one entry indicating a first recorded portion of a user data area and a second recorded portion of the user data area and including information on a position of the first recorded portion and a position of the second recorded portion, the second recorded portion including data for over-writing data in the first recorded portion, and the controller configured to control the optical pick-up device to read data from the second recorded portion when an instruction for reading data from the first recorded portion is received, wherein the at least one entry includes a single entry relating to the second recorded portion if the data for over-writing data in the first recorded portion is recorded in a single recording unit and only two entries related to the second recorded portion if the data for over-writing data in the first recorded portion is recorded in a plurality of consecutive recording units even if the plurality of consecutive recording units is more than two recording units.

27. A recording medium having a data structure for managing over-writing of data on the recording medium, comprising:

a user data area being divided into a number of recording areas, a management area for storing at least one entry, the at least one entry indicating a first recorded portion of the user data area and a second recorded portion of the user data area and including information on a position of the first recorded portion and a position of the second recorded portion, the second recorded portion including data for over-writing data in the first recorded portion, wherein the at least one entry includes a single entry relating to the second recorded portion if the data for over-writing data in the first recorded portion is recorded in a single recording unit and only two entries related to the second recorded portion if the data for over-writing data in the first recorded portion is recorded in a plurality of consecutive recording units even if the plurality of consecutive recording units is more than two recording units.

* * * * *